UNITED STATES PATENT OFFICE.

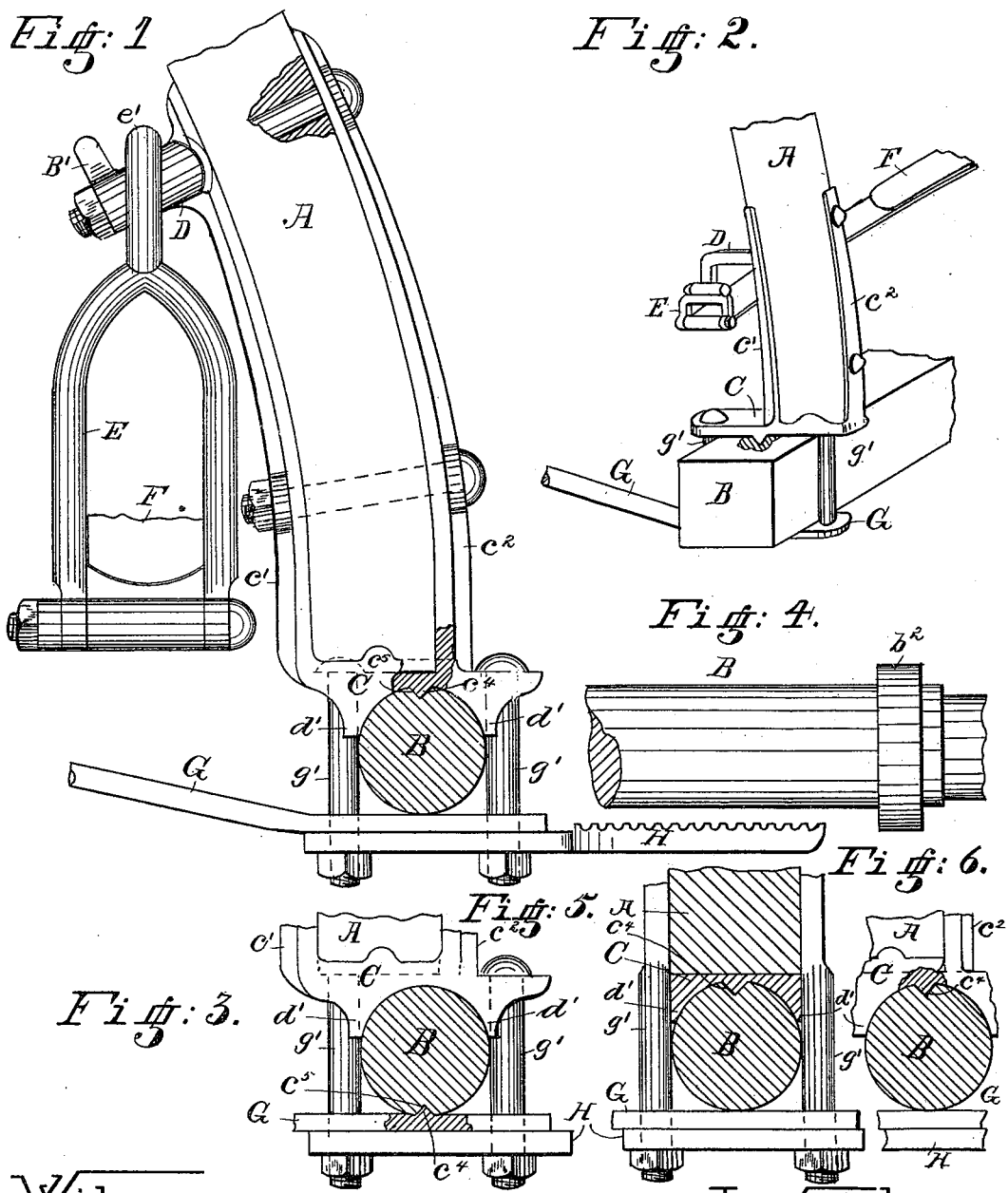

DAVID M. PARRY AND THOMAS H. PARRY, OF INDIANAPOLIS, INDIANA.

VEHICLE ATTACHMENT.

SPECIFICATION forming part of Letters Patent No. 405,905, dated June 25, 1889.

Application filed February 18, 1889. Serial No. 300,359. (No model.)

*To all whom it may concern:*

Be it known that we, DAVID M. PARRY and THOMAS H. PARRY, citizens of the United States, residing at Indianapolis, in the county of Marion and State of Indiana, have invented certain new and useful Improvements in Vehicle Attachments; and we do hereby declare the following to be a full, clear, and exact description of the invention, such as will enable others skilled in the art to which it appertains to make and use the same.

This invention in vehicles relates especially to improvements in the axle, shaft and axle clip, and spring-support, and in the special construction, combination, and arrangement thereof, as hereinafter fully set forth.

This present invention is intended as an improvement upon the inventions described in an application filed by us in the United States Patent Office November 17, 1888, and granted February 19, 1889, to which reference may be had.

One of the chief objects of this invention is to use a round axle with the clip, and so construct the axle and clip that the two will be firmly clipped together, and any longitudinal or transverse movement of the axle with relation to the clip be obviated; and another object of the invention is to provide the clip with a "shackle" to support the vehicle-spring, and to so arrange the same that it may be quickly removed, all of which will be hereinafter fully set forth.

The invention consists in the special construction, combination, and arrangement of the axle, shaft-clip, and spring-supporter, substantially as hereinafter described and claimed.

In the drawings, Figure 1 represents in side elevation a clip, spring-support, and axle constructed and arranged substantially in accordance with this invention, the shaft-clip, which is of the same general construction as the one described in the application above referred to, being provided at its upper end with a headed projection to receive and support a spring-supporting link, and the axle being shown as round with a detent therein entered by a projection on the clip, said axle being in section; Fig. 2, a perspective view of a shaft and axle clip having a modified construction of spring-supporter secured thereto, the axle herein being shown as square; Fig. 3, a detail of a portion of the shaft, shaft-clip, and axle, showing an equivalent way of securing the axle against movement; Fig. 4, a detail in plan view of a portion of the axle; Fig. 5, a detail showing the clip in three pieces; and Fig. 6, a detail in section showing the clip and axle as detented, with a separate key therein.

The clip which secures the shaft A to the axle B will preferably be of the same general construction as the clip described in the application referred to, it consisting of a horizontal base-plate C and two upright arms $c'$ and $c^2$, slightly curved and remote from each other, between which arms the lower end of the shaft is secured by bolts. At the upper end of the clip is an outwardly-projected arm D, which will preferably be cast integral with the curved arm $c'$ at or in close proximity to the upper bolt-hole, which arm acts to support a swinging link E, upon which one end of the vehicle-spring F is supported.

In Fig. 1 the supporting-arm D is shown as having an elongated head $D'$ at its forward end, and as cored out to receive the bolt which passes through the upper end of the clip, and as having a bifurcated hanger or swinging link E loosely engaged therewith, said link having an elongated eye $e'$ at its upper end of sufficient length to readily pass over the headed end of the arm D, the opposite open end of the link having a bolt or pin extended through it to support the spring F. In Fig. 2 the arm D is shown as formed upon the clip similarly, said arm being solid, with its end bent downward, with an eye therein, to which is pivoted by ears and a pin a bifurcated shackle or link E, having a movable "pin" bearing at its lower end to support the spring F. In our opinion these constructions of spring-supporters and clips just described are substantially equivalent, and therefore we do not desire to limit ourselves to any special form, and as it is new with us to construct a shaft and axle clip having a shackle yielding or flexible spring-support directly connected therewith, we desire to draw a claim of sufficient breadth to fully cover both constructions illustrated and any equivalent construction thereof.

If desired, the bent arm D (shown in Fig.

2) might be cored out and the shaft-bolt be extended through it in the manner shown in Fig. 1.

At the lower end of the clip, at the front and rear sides, are two downwardly-projecting flanges $d'$, with annular internal faces to engage around the round axle B, as shown in Fig. 1, the axle being shown as secured between the clip and rear portion of the brace-rod G (or a metal strap) by bolts $g'$ in the manner illustrated in the application referred to, the base-plate C, having a downward projection $c^4$ to enter a detent $c^5$ formed in the face of the axle. If desired, the projection might be formed on the rear portion of the brace-rod and extended into a detent formed in the under face of the axle, as shown in Fig. 3. If a square axle is used, it will be secured in the manner preferably illustrated in Fig. 2, which construction and arrangement are similar to those described in Patent No. 396,231, heretofore granted to one of us.

We have found by experience that a round axle, if it could be constructed so as to be firmly clipped without danger of movement, would be preferable, as it could be made light and very much cheaper.

Our improved axle is constructed as follows: A bar of round rolled iron or steel is swaged up near its ends to form annular collars $b^2$, and the axle ends are then turned, or otherwise formed, to the proper diametrical shape, and the ends screw-threaded, after which indentations are formed in the face thereof to be entered by projections upon the clip or upon the brace-rod or strap, as shown.

It is obvious that projections might be formed upon the axle to enter indentations in the clips, if desired.

Secured below the axle by the same bolts that clip the axle and other parts together is a rearwardly-projecting corrugated face step H.

By the construction herein shown and described it will be seen that we secure a combined shaft and axle clip and spring-supporting shackle, wherein the shackle is capable of various movements, allowing free and unobstructed movement of the spring, which construction and arrangement have many advantages. Being strong and durable, it forms a yielding spring-support in close proximity to the axle, and thus brings the weight of the body central or nearly central with relation to the balancing-point of the vehicle, and by the construction and arrangement of axle and clip as described the cost of manufacture is materially cheapened, and an axle is provided that in case of breakage or distortion may be readily and quickly repaired.

The spring F is pivoted to the link by means of a bolt extended through an eye formed on the end thereof, as shown.

It is obvious that the clip might be made in several pieces, as shown in Fig. 5—i. e., two clip-irons with their ends shaped to form bolts, with a filling piece or base for the shaft to rest upon, which base has the projection to enter the detent in the axle.

It is also obvious that the base-piece of the clip might have a detent formed therein as well as the axle, and a key or a piece of metal be seated in both detents to hold the axle against movement, as shown in Fig. 6.

We claim—

1. In a vehicle, the combination, with the shaft and axle, of a shaft-clip having upwardly-extended arms to embrace the shaft, and having the outwardly-projected headed arm D at its upper end, and a link having an eye to embrace said headed arm, substantially as shown and described.

2. In combination, the axle B, with detents $c^5$, the clips $c^4$, having projections to enter said detents, arms to embrace the shaft and flanges to embrace the axle, and having an outward headed projection D at the upper end of its inner arm, and the spring-supporting link or shackle pivotally supported by said arm, substantially as shown and described.

3. In a vehicle, the axle-clip having a spring-supporting link or shackle pivotally connected to its upper end, and having axle-embracing flanges at its lower end, and projections $c^4$ to enter detents in the axle, in combination with the axle B, having detents, as described, a strap or brace-rod, and a rearwardly-projecting step secured to the clip by bolts below the axle, substantially as shown and described.

In testimony whereof we affix our signatures in presence of two witnesses.

DAVID M. PARRY.
THOMAS H. PARRY.

Witnesses:
N. E. C. WHITNEY,
JOSEPH A. MINTURN.